US007920618B2

(12) United States Patent
Lyle et al.

(10) Patent No.: US 7,920,618 B2
(45) Date of Patent: Apr. 5, 2011

(54) INSERTION OF NULL PACKETS TO MITIGATE THE EFFECTS OF INTERFERENCE IN WIRELESS COMMUNICATIONS

(75) Inventors: Ruthie D. Lyle, Durham, NC (US); Jame Pleasant Lynch, Jr., Durham, NC (US); Usen E. Udoh, Raleigh, NC (US); William Vigilante, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 12/349,590

(22) Filed: Jan. 7, 2009

(65) Prior Publication Data

US 2009/0180450 A1    Jul. 16, 2009

Related U.S. Application Data

(63) Continuation of application No. 10/064,269, filed on Jun. 27, 2002, now abandoned.

(51) Int. Cl.
*H04B 1/713* (2011.01)
(52) U.S. Cl. .................. 375/132; 375/338; 455/63.1
(58) Field of Classification Search .................. 375/132, 375/338; 455/63.1
See application file for complete search history.

(56) References Cited

U.S. PATENT DOCUMENTS

| | | | |
|---|---|---|---|
| 6,278,723 B1 | 8/2001 | Meihofer et al. | 375/133 |
| 6,279,153 B1 | 8/2001 | Bi et al. | 717/11 |
| 6,327,300 B1 | 12/2001 | Souissi et al. | 375/219 |
| 6,466,793 B1 | 10/2002 | Wallstedt et al. | 455/450 |
| 6,553,060 B2 | 4/2003 | Souissi et al. | 375/219 |
| 6,603,799 B1 | 8/2003 | Hlasny | 375/132 |
| 6,771,968 B1 | 8/2004 | Heubel | 455/454 |
| 6,788,654 B1 | 9/2004 | Hashimoto et al. | 370/321 |
| 6,891,857 B1 | 5/2005 | Nevo et al. | 370/480 |
| 7,027,418 B2 | 4/2006 | Gan et al. | 370/329 |
| 7,039,417 B2 | 5/2006 | Lyle et al. | 455/452.2 |
| 2001/0009555 A1 | 7/2001 | Diepstraten et al. | 370/468 |
| 2001/0010689 A1 | 8/2001 | Awater et al. | 370/344 |
| 2001/0021639 A1 | 9/2001 | Kaku | 455/41 |
| 2001/0041594 A1 | 11/2001 | Arazi et al. | 455/561 |
| 2001/0051530 A1 | 12/2001 | Shiotsu et al. | 455/522 |
| 2002/0097681 A1 | 7/2002 | Treister et al. | 370/238 |
| 2002/0116460 A1 | 8/2002 | Treister et al. | 709/204 |
| 2002/0136268 A1 | 9/2002 | Gan et al. | 375/133 |
| 2003/0231607 A1 | 12/2003 | Scanlon et al. | 370/338 |
| 2003/0235179 A1 | 12/2003 | Tuomela et al. | 370/347 |

OTHER PUBLICATIONS

WLAN and WPAN coexistence in UL band; Howitt, I.; Vehicular Technology, IEEE Transactions on vol. 50, Issue 4, Jul. 2001, pp. 1114-1124.
Interference aware Bluetooth packet scheduling; Golmie, N. et al.; Global Telecommunications Conference, 2001. GLOBECOM '01. IEEE vol. 5, Nov. 25-29, 2001 pp. 2857-2863 vol. 5.

(Continued)

*Primary Examiner* — Temesghen Ghebretinsae
(74) *Attorney, Agent, or Firm* — Winstead, P.C.

(57) ABSTRACT

Mitigation of interference effects in certain wireless communications is accomplished by the disclosed method. A wireless communications device communicates utilizing a protocol which requires hopping from channel to channel within a communications frequency band while transmitting. Operating according to the disclosed method, the device scans the available communications channels and identifies channel(s) experiencing interference from other transmitting devices. When hopping to such identified channels, the device transmits only null packets, thus avoiding the need to re-transmit packets due to interference and mitigating the effects of such interference on the communications data rate.

23 Claims, 5 Drawing Sheets

OTHER PUBLICATIONS

Coexistence mechanism for interference mitigation between IEEE 802.11 WLANs and Bluetooth Chiasserini, C.F. et al.; INFOCOM 2002. 21$^{st}$ Annual Joint Conf. of IEEE Comp. and Comm. Societies. Proceedings. IEEE vol. 2, Jun. 23-27, 2002 pp. 590-598.

Techniques to improve Bluetooth performance in interference environments; Golmie, N. et al.; Mil. Comm. Conf., 2001. MILCOM 2001. Comm. for Network-Centric Operations: Creating the Information Force. IEEE vol. 1, Oct. 28-31, 2001 p. 581-585.

"IEEE Approves Ieee 802.15.1 Standard for Wireless Personal Area Networks Adapted from the Bluetooth Specification," *IEEE* http://standards.ieee.org/announcements/802151app.html, Mar. 21, 2002.

Tzamaloukas, A., et al. "Receiver Initiated Channel Hopping for Ad-hoc Networks," *Wireless Communications and Networking Conference, 2000, WCNC, 2000 IEEE*, vol. 3, Sep. 23-28, 2000, pp. 1262-1267.

"Initial Tests Show No Performance Degradation Due to Interference Between Bluetooth and 802.11," *Bluetooth, the Official Website*, http://www.bluetooth.com/news/news.asp?A=2&PID=10, Dec. 10, 2001.

Anvekar, D. et al., "Frequency Lookahead and Link State History Based Interference Avoidance in Wireless Pico-cellular Networks," *Personal Wireless Communications, 2000 IEEE International Conference*, Dec. 17-20, 2000, pp. 434-438.

Anvekar, D. et al: "Frequency Look-ahead and Link State History Based Scheduling in Indoor Wireless Pico-Cellular Networks," U.S. Appl. No. 09/452,802, filed Feb. 2, 1999.

INSERTION OF NULL PACKETS TO MITIGATE THE EFFECTS OF INTERFERENCE IN WIRELESS COMMUNICATIONS

CROSS REFERENCE TO RELATED APPLICATIONS

The present application is a continuation application of pending U.S. patent application Ser. No. 10/064,269, which was filed on Jun. 27, 2002, which is assigned to the assignee of the present invention. The present application claims priority benefits to U.S. patent application Ser. No. 10/064,269.

BACKGROUND OF INVENTION

Wireless communications is currently enjoying a period of rapid technological advancement and tremendous growth in popularity. In order to allow wireless communication to become truly convenient and omnipresent, standards have been developed and implemented so that the various wireless-enabled devices may readily communicate with one another. One such standard has been developed by Bluetooth SIG, Inc. (SIG="Special Interest Group"), a consortium of companies interested in seeing the growth in wireless networks continue. The standard developed by this group has become known as Bluetooth and devices conforming to the standard are known as Bluetooth devices or Bluetooth-enabled devices. The Bluetooth standard is based on the IEEE ("Institute of Electrical and Electronics Engineers") 802.11b standard and applies to a short-range radio system designed to replace cables in a personal area network (in the 10 m range). These devices operate in what is known as the Industrial Science and Medicine ("ISM") communications band around a frequency of 2.45 Ghz. The ISM band actually extends from 2.4 Ghz to 2.480 Ghz and includes 79 communication channels or subranges of frequency, on which devices may communicate.

Many other types of devices operating according to applicable standards also operate on the various channels within the ISM band. For instance, Wireless Local Area Network ("WLAN") devices (also based on the IEEE 802.11b standard) operate in the ISM. Devices operating according to the WLAN standard are designed to replace a wired LAN infrastructure. Other types of devices that operate in the ISM band include microwaves, various types of monitoring devices such as baby monitors, etc.

Very recently, the IEEE Standards Board adopted a new communications standard, IEEE 802.15.1, known as "Wireless MAC and PHY Specifications for Wireless Personal Area Networks (WPANs™)". This standard closely mirrors the Bluetooth standard. Adoption of such a standard by the widely-recognized IEEE Standards Board means that wireless devices designed to operate in wireless personal area networks are even more likely to model their operation on this standard. Unless otherwise noted, where specific features or requirements of the Bluetooth standard and Bluetooth devices are discussed below, those same features or requirements are present in the IEEE 802.15.1 standard.

As enabling technologies advance and as standards are developed and adopted, wireless networks and the communications and other applications running thereon, are expected to become more and more prevalent. This area of technology is expected to experience explosive growth over the next several years. Even before the recent standard adoption by the IEEE, it was forecast that by the year 2004 there will be over 100 million Bluetooth devices in the United States alone and over 400 million worldwide.

One problem associated with all types of wireless communications is that signals being transmitted by different devices at the same frequency can interfere with one another. This can be referred to as co-channel interference when it occurs between devices operating in the same ISM channel. Interference can also occur between devices operating at frequencies which are not the same but which are close to one another. For devices operating in adjacent ISM channels, this can be referred to as adjacent interference. Both types of interference can cause communication packets to be lost, garbled or misinterpreted by the receiving device, hindering the practical speed and accuracy of the wireless communications.

In an attempt to minimize the incidence of serious interference, the Bluetooth standard calls for Bluetooth devices to "hop" on all 79 channels within the ISM band. That is, the devices transmit only a certain amount of data on a channel before moving to another channel to continue transmitting. The standard establishes the criteria for hopping—how much data to transmit on each channel, when to hop and the order in which to hop to each channel. Devices following the standard understand these criteria and are able to establish and maintain communications with one another while hopping from channel to channel. Because of the advantages of hopping from channel to channel while transmitting, it is likely that other, non-Bluetooth devices will implement this strategy for avoiding interference.

The Bluetooth standard calls for re-transmitting packets when data is lost in transmission, typically due to interference. The procedure for re-transmitting increases transmission time and degrades the data rate. In many of the applications to which Bluetooth devices are applied, such as voice transmissions over IP (internet protocol), even the smallest degradation in the data rate is unacceptable because the quality of the signal quickly degrades to an unusable state.

Unlike Bluetooth devices, WLAN devices, and most other devices operating in the ISM band, select one static channel and transmit data only on that channel. Because they are designed to operate over a greater distance than Bluetooth devices, WLAN devices transmit much more powerful signals. Therefore, Bluetooth device signals can experience serious interference problems when hopping to a channel upon which a WLAN device is transmitting, or to an adjacent channel. As Bluetooth and WLAN devices, and other types of devices operating in the ISM band, become more and more popular, the prevalence of this type of interference will increase. The resulting degradation in performance will seriously hinder customer acceptance of this emerging technology.

For these reasons, and others readily identified by those skilled in the art, it would be desirable to develop communications techniques applicable to the Bluetooth (and IEEE 802.15.1) standard, and to the communication protocols of any other wireless devices which hop from channel to channel while transmitting, which will minimize the effects on performance of any interference due to the transmission signals of other devices in the ISM band.

SUMMARY OF INVENTION

The present invention contemplates a method whereby a wireless device communicating according to certain communications standards may eliminate or mitigate the effects on the communication rate of interference from other wireless communications signals. The present invention is applicable to wireless devices operating according to any communications standard which requires that the device hop from communications channel to communications channel within a defined communication frequency band. This method does not require changes to the standards definitions nor does it require any modifications to the receiving device. In realizing these and other purposes of the present invention, a communications method calls for a wireless device to scan the channels of the applicable communications frequency band and identify any channel where other device(s) are transmitting and causing interference. When the wireless device hops to one of the channels identified as experiencing interference, the device transmits only null packet (s) on that channel instead of data packet(s). Normal communications transmission is continued when the device hops to a channel which has not been identified as experiencing interference.

BRIEF DESCRIPTION OF DRAWINGS

Some of the purposes of the invention having been stated, others will appear as the description proceeds, when taken in conjunction with the accompanying drawing, in which.

DETAILED DESCRIPTION

While the present invention will be described more fully hereinafter with reference to the accompanying drawings, in which a preferred embodiment(s) of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Devices capable of wireless communications according to the Bluetooth, IEEE 802.15.1 and other standards and the various methods and technologies employed by such devices to transmit and receive data are well known to persons skilled in the relevant arts. Such devices may be implemented in any of the many alternate embodiments that are available without departing from the spirit of the present invention. Detailed descriptions of such devices and technologies are not required for an understanding of the present invention. This invention relates only to an improvement to the method of operation of such devices.

Figure 1:
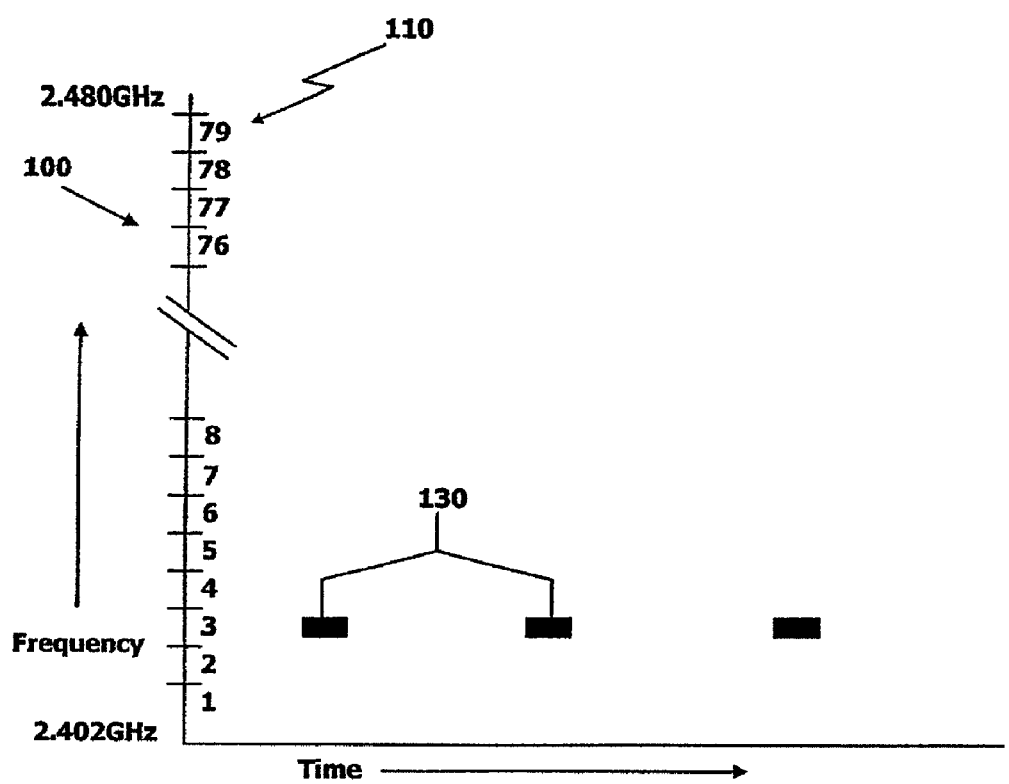
FIG. 1 is a figurative illustration of the ISM communications frequency band showing a WLAN device transmitting on one channel.

In accordance with this invention, a device capable of wireless communication over one or more channels within a defined frequency band, such as a Bluetooth device, for example, is provided with the capability of scanning the available channels and identifying any channels on which other devices are transmitting. FIG. 1 illustrates the ISM communications band 100 with its various communications channels 110. A WLAN device (not shown), for example, transmitting communications packets 130 on one of the channels, identified as channel 3 for purposes of illustration. In this example, channel 3 would be identified as experiencing interference.

Figure 2:
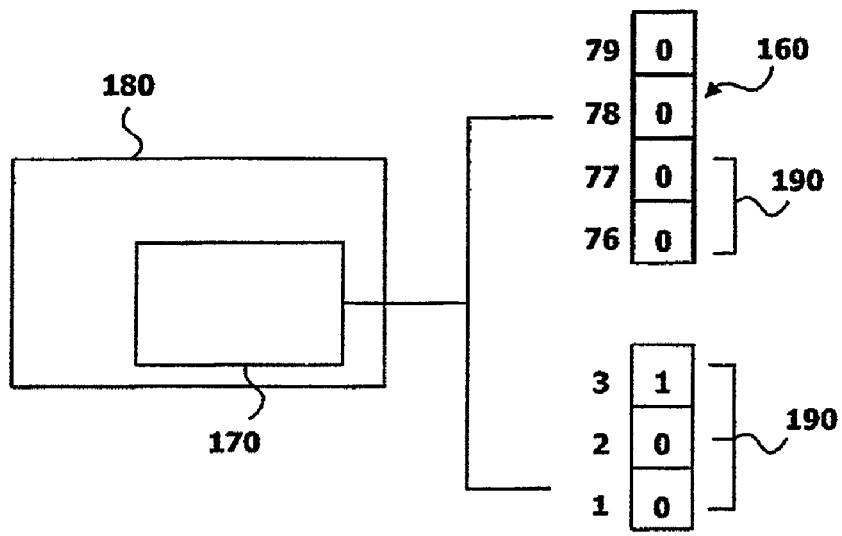
FIG. 2 is a simple representation of a wireless communications device according to the present invention, showing one possible method of marking channels which are experiencing interference.

A Bluetooth device practicing the communications method according to the present invention includes the capability to maintain a record of which channel(s) have been so identified at least as long as the device is powered on and operating. With reference to FIG. 2, this might be accomplished using a simple array 160 stored in a local volatile or non-volatile memory module 170 of the communicating device 180. The array could include an entry 190 for each available channel whose value (0 or 1, for example) could indicate whether the associated channel was currently identified as experiencing interference. The device could alternatively maintain a record of channels identified as experiencing interference in any one of the many other ways such information is stored and accessed in electronic devices, as well understood by those skilled in the relevant arts.

As discussed above, a communications device according to the present invention hops from channel to channel while transmitting data. When practicing the method of the present invention, the device checks its record of channels experiencing interference each time it hops. If it is hopping to a channel currently marked as experiencing interference, only null packets, that is, packets containing no data, are transmitted on such channel. If it is hopping to a channel that is not currently marked as experiencing interference, normal data packets are transmitted. In this way, the device avoids the need to retransmit packets which are lost or garbled due to being transmitted on channels experiencing interference. Since the device knows that only null packets were transmitted on those channels, any packets lost or garbled on those channels can simply be ignored.

Figure 3:
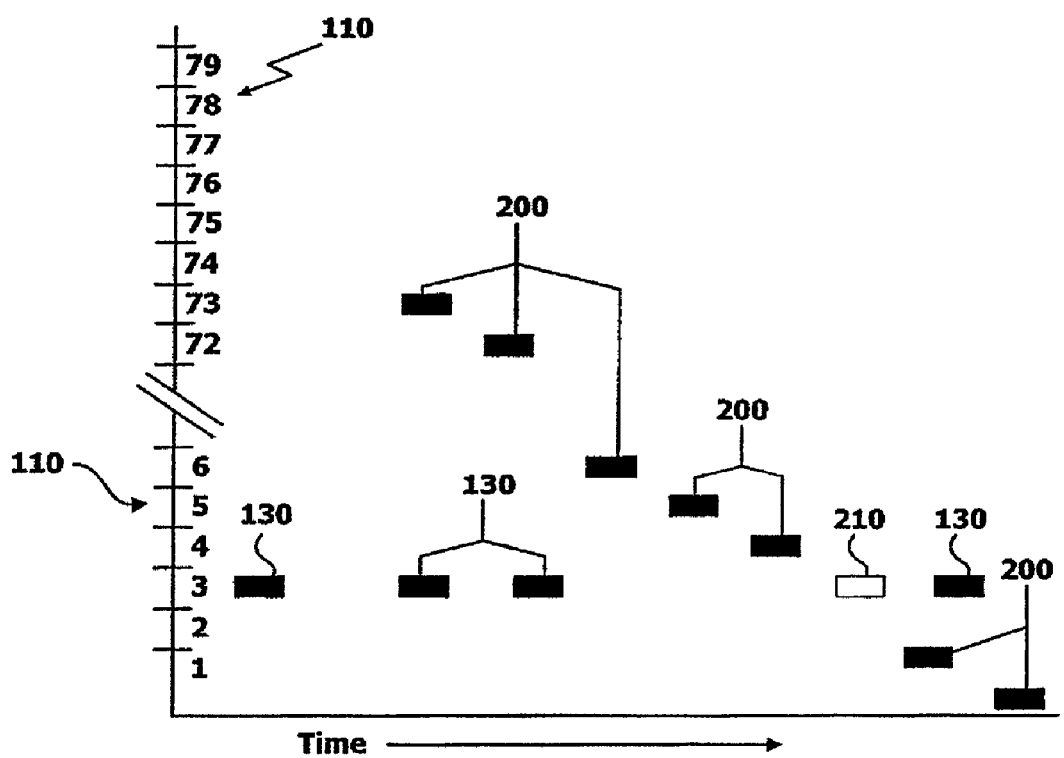
FIG. 3 is a figurative illustration of a wireless communications device according to the present invention transmitting data.

Referring now to FIG. 3, a communicating device according to the present invention is (not shown) transmitting data packets 200 on the various available communications channels 110 in the manner called for by the Bluetooth and similar standards. As described in the example above, channel 3 has been identified as experiencing interference from a transmitting WLAN device. As such, when hopping to channel 3, the device according to the present invention only transmits a null packet (s) 210, and continues transmitting data packets 200 when the transmission moves on to other channels.

Figures 4A, 4B:
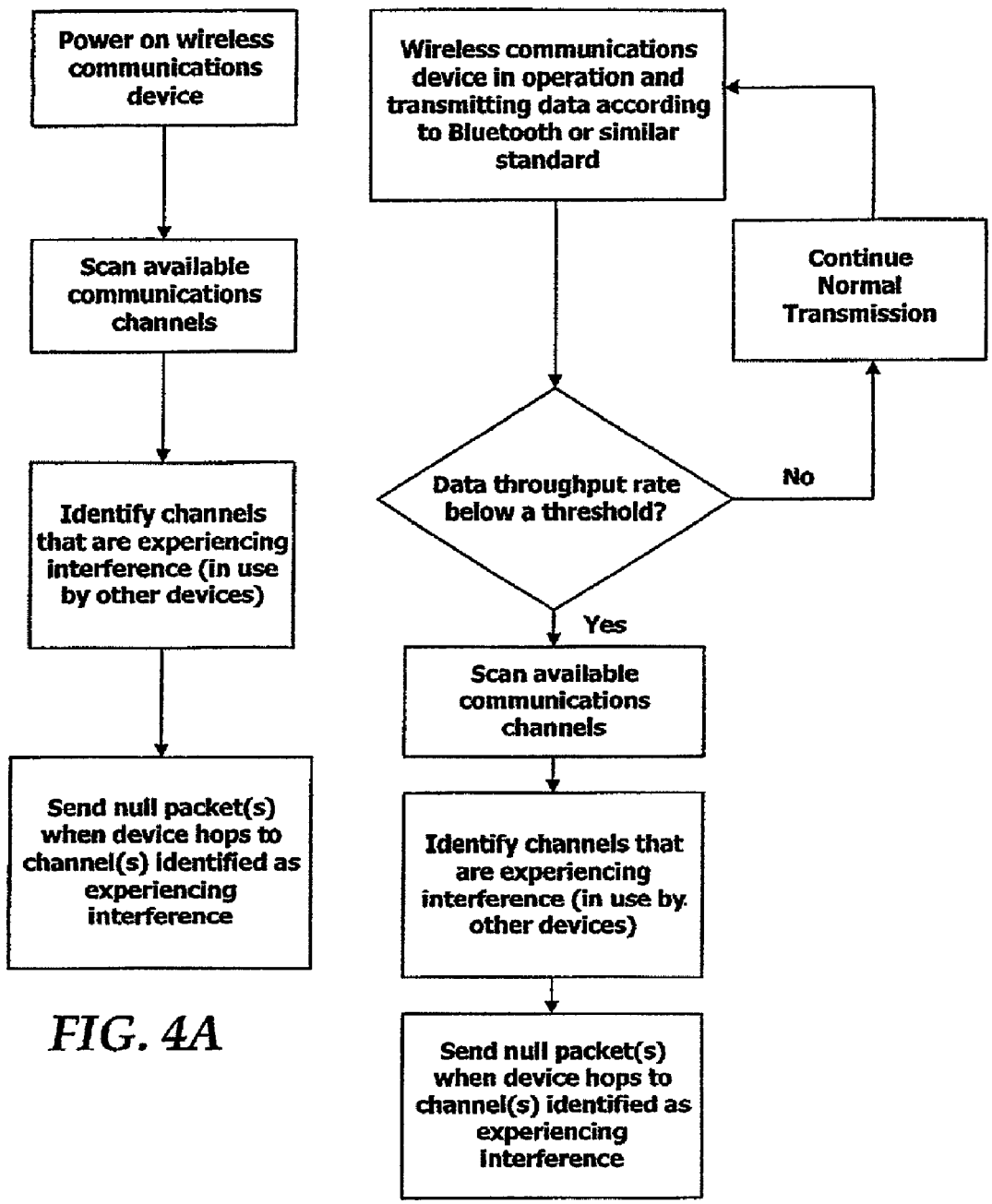
FIG. 4a is a flow-chart of a first embodiment of the method of the present invention.
FIG. 4b is a flow-chart of a second embodiment of the method of the present invention.

In one embodiment of the present invention, a wireless communications device practicing the method of the present invention automatically scans the available communications channels upon power up, marking those channels experiencing interference. This embodiment of the present method is illustrated in FIG. 4a. In another embodiment, a wireless communications device practicing the method of the present invention would not automatically scan the channels at power up. Instead, scanning would be initiated only if the communications data rate dropped below a certain level. The threshold data rate could be user-configurable or could be set at manufacture. In any event, the threshold would be set at a point where it is apparent that interference is seriously impacting the effective data rate. This embodiment of the present method is illustrated in FIG. 4b.

Figure 4C:
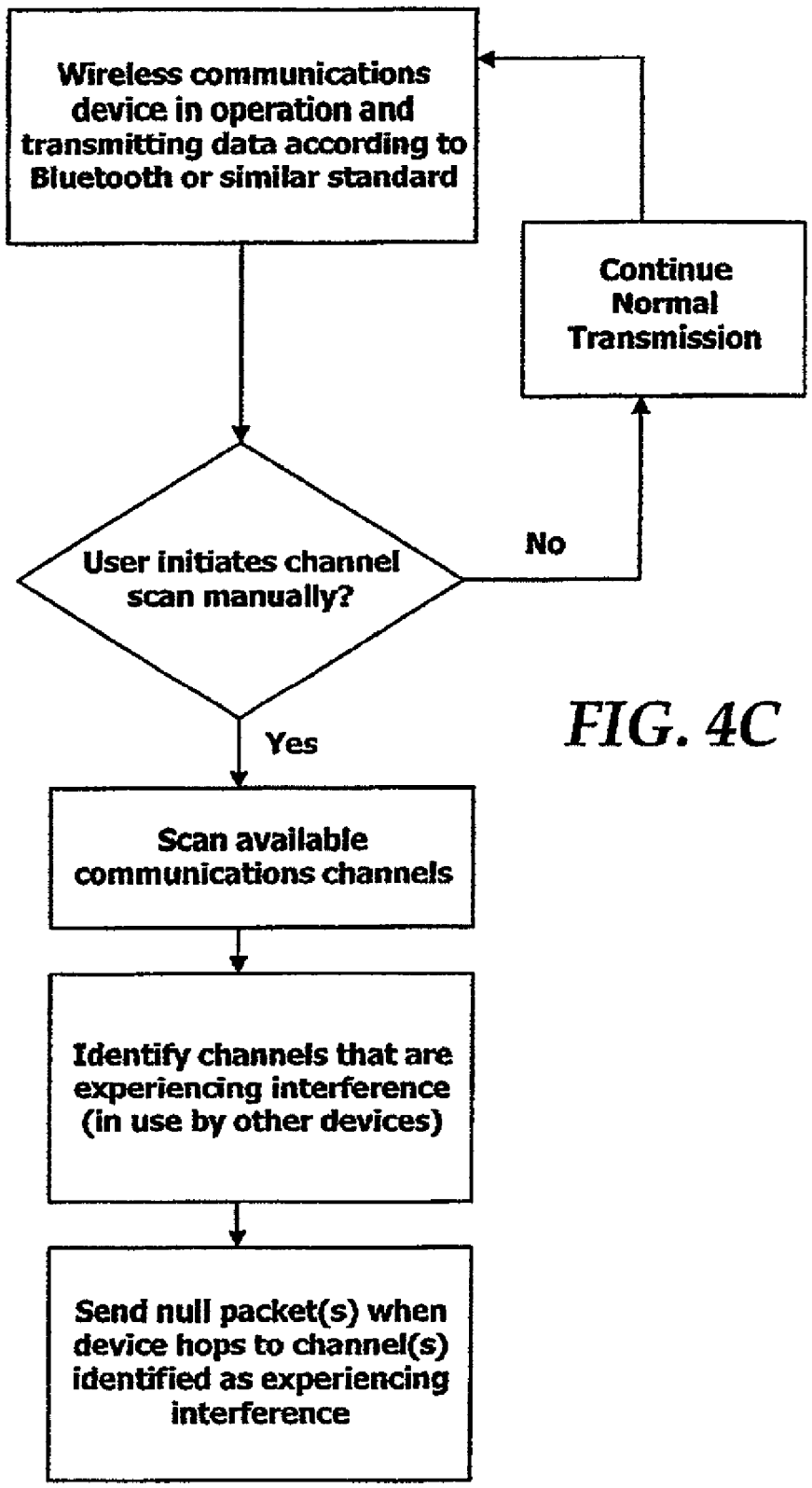
FIG. 4c is a flow-chart of a third embodiment of the method of the present invention.
Figure 4D:
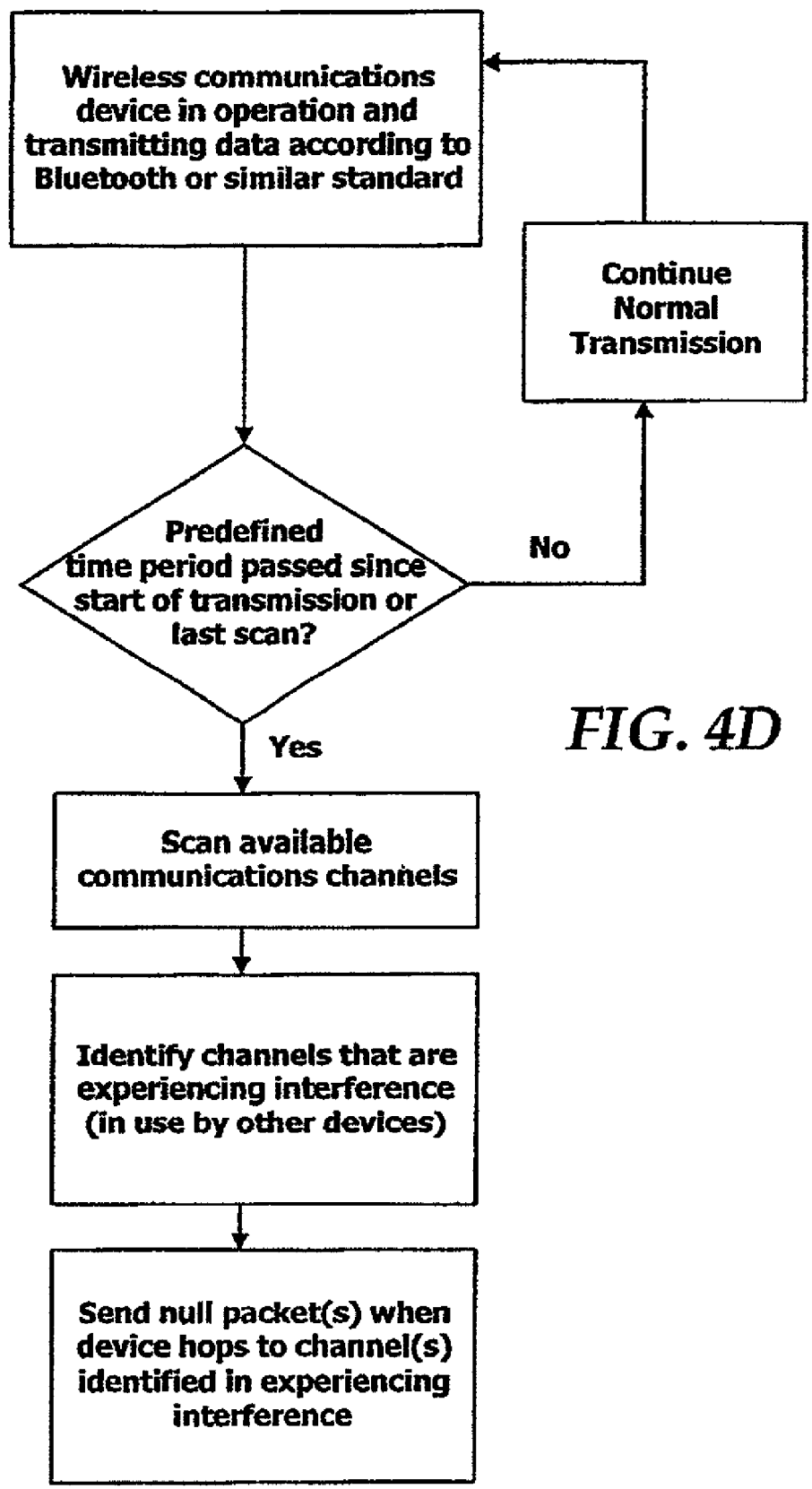
FIG. 4d is a flow-chart of a fourth embodiment of the method of the present invention.

A third embodiment calls for a wireless communications device practicing the method of the present invention to initiate a scan of the channels for interference only when manually triggered to do so by a user. This embodiment of the present method is illustrated in FIG. 4c. Finally, a fourth embodiment requires that the wireless communications device practicing the method of the present invention perform the channel scan after the passage of a certain time period. This embodiment of the present method is illustrated in FIG. 4d. Again, the time period could be user-configurable or could be set at manufacture. This would insure that the channels marked as experiencing interference would remain accurate and up-to-date.

These embodiments of the present method can also be used in combination. A wireless communications device of the present invention could scan for channels experiencing interference upon power up. Then, if the wireless communications data rate were to fall below a certain rate, the device could initiate a new scan to determine if different or additional channels were experiencing interference. Or, a new scan could be initiated after each passage of a certain amount of time. This would avoid the situation where the device continues sending null packets on a channel marked as experiencing interference long after the marked channel ceased experiencing interference. On top of all that, the device could allow a user to initiate a new scan at any time through some type of user input interface.

As readily recognized by those skilled in the art, the exact order of the method steps illustrated and discussed herein may be varied in any advantageous manner without deviating from the present invention. Also, where appropriate, steps may be repeated, skipped or combined to better operate in a given environment.

In the drawings and specification there has been set forth preferred embodiments of the invention, and, although specific terms are used, the description thus given uses terminology in a generic and descriptive sense only and not for purposes of limitation.

The invention claimed is:

1. In a wireless communications system providing for communication over two or more channels utilizing a communications architecture that calls for hopping from channel to channel during data transmission, a method for mitigating the effects of interference, the method comprising:
    scanning the channels for interference and identifying channels experiencing interference;
    transmitting null packets only to channels identified as experiencing interference; and
    transmitting normal data when hopping to a channel not identified as experiencing interference.

2. The method of claim 1 wherein the scanning step is performed upon the commencement of data transmission.

3. The method of claim 1 wherein the scanning step is performed upon each passage of a first time period.

4. The method of claim 2 wherein the scanning step is repeated periodically during data transmission.

5. The method of claim 1 wherein the scanning step is performed when a data throughput rate falls below a predefined value.

6. The method of claim 1 wherein the scanning step is performed when requested by a user.

7. The method of claim 2 wherein the scanning step is repeated whenever:
    a) a second time period has passed;
    b) a data throughput rate falls below a predefined value; or
    c) requested by a user.

8. The method of claim 1 wherein the communication architecture is the standard known as Bluetooth.

9. The method of claim 1 wherein the communication architecture is the standard known as IEEE 802.15.1.

10. The method of claim 7 wherein the communication architecture is the standard known as Bluetooth.

11. The method of claim 7 wherein the communication architecture is the standard known as IEEE 802.15.1.

12. In a wireless communications system providing for communication in the ISM communications frequency band by a communications device operating according to the Bluetooth standard, a method for mitigating the effects of interference, the method comprising:
    upon power up of the device, scanning the available channels for interference and identifying channels experiencing interference;
    transmitting null packets only to channels identified as experiencing interference; and
    transmitting normal data when hopping to a channel not identified as experiencing interference.

13. The method of claim 12 wherein the scanning step is repeated periodically during data transmissions.

14. The method of claim 12 wherein the scanning step is repeated when a data throughput rate falls below a predefined value.

15. The method of claim 12 wherein the scanning step is repeated when requested by a user.

16. The method of claim 12 wherein the scanning step is repeated whenever:
    a) a third time period has passed;
    b) a data throughput rate falls below a predefined value; or
    c) requested by a user.

17. In a wireless communication system providing for communication in the ISM communications frequency band by a communications device operating according to the IEEE 802.15.1 standard, a method for mitigating the effects of interference, the method comprising:
    upon power up of the device, scanning the available channels for interference and identifying channels experiencing interference;
    transmitting null packets only to channels identified as experiencing interference; and
    transmitting normal data when hopping to a channel not identified as experiencing interference.

18. The method of claim 17 wherein the scanning step is repeated when a data throughput rate falls below a predefined value.

19. The method of claim 17 wherein the scanning step is repeated when requested by a user.

20. The method of claim 17 wherein the scanning step is repeated whenever:
    a) a fourth time period has passed;
    b) a data throughput rate falls below a predefined value; or
    c) requested by a user.

21. The method of claim 1 further comprising:
    transmitting said null packets when hopping to a channel currently marked as experiencing interference.

22. The method of claim 12 further comprising:
    transmitting said null packets when hopping to a channel currently marked as experiencing interference.

23. The method of claim 17 further comprising:
    transmitting said null packets when hopping to a channel currently marked as experiencing interference.

* * * * *